United States Patent [19]

Girola

[11] 3,807,685
[45] Apr. 30, 1974

[54] HYDRAULIC COPYING APPARATUS
[75] Inventor: Angelo Girola, Busto Arsizio, Italy
[73] Assignee: Duplomatic-Meccanica Applicazioni Oleodinamiche S.p.A., Busto Arsizio (Varese), Italy
[22] Filed: May 4, 1972
[21] Appl. No.: 250,351

[30] Foreign Application Priority Data
May 10, 1971 Italy.................................. 68527/71

[52] U.S. Cl...................... 251/3, 90/62 R, 137/270, 60/97 T, 33/23 K
[51] Int. Cl........................................... B23q 35/26
[58] Field of Search................ 90/62 R, 13.5; 251/3; 137/270; 60/97 T; 33/23 K

[56] References Cited
UNITED STATES PATENTS

| 3,139,002 | 6/1964 | Evans...................................... | 90/62 |
| 3,186,425 | 6/1965 | Weaver................................ | 251/31 X |
| 3,330,293 | 7/1967 | Holmes................................ | 251/31 X |
| 3,390,859 | 7/1968 | Rosebrook, Sr........................ | 251/3 |

Primary Examiner—Andrew R. Juhasz
Assistant Examiner—Z. R. Bilinsky
Attorney, Agent, or Firm—Sughrue, Rothwell, Mion, Zinn & Macpeak

[57] ABSTRACT

This invention provides hydraulic copying apparatus for application to machine tools such as milling machines, in which the axial and oscillatory movements of a stylus control three copying valves, two of which are arranged with axes perpendicular to each other in a plane perpendicular to the axis of the stylus and the third of which is arranged with its axis non-coaxial with the axis of the stylus. An oscillating device such as a lever operates the third valve, and is always operatively connected to the end of the stylus both in the manual and the automatic tracing mode of the apparatus, to transfer to the third valve only the axial movements of the stylus. Externally operable means act on the oscillating device for the actuation of the third valve in response to the oscillations of the stylus, these means being rendered operative during automatic functioning of the apparatus, while the first two valves are contemporaneously rendered inoperative.

7 Claims, 6 Drawing Figures

HYDRAULIC COPYING APPARATUS

BACKGROUND OF THE INVENTION

The present invention relates to hydraulic copying apparatus for application to machine tools, especially milling machines.

Hydraulic copying apparatus for machine tools is already known in general.

Such apparatus consists essentially of a stylus the end of which is caused to move, either under manual or automatic control, over the surface contours, however complex, of a pattern or template to be copied; the axial and oscillatory movements of the stylus control the opening and closing of hydraulic valves which, in their turn, cause relative movements between a workpiece and a tool, so that the template contours are reproduced on the workpiece.

Among hydraulic copying apparatus of the above type some are known which are adapted to effect copying of the contours of a pattern or template by means of a three-dimensional pantograph system with manual control of the stylus scanning movements. In apparatus of this type the stylus controls independently three hydraulic copying valves two of which are sensitive to oscillations of the stylus in planes substantially parallel to the superficies of the pattern whilst the third is sensitive only to the axial displacements of the stylus in a direction substantially perpendicular to the superficies of the said pattern. Such apparatus obviously allows of copying only with manual contour scanning of the pattern.

In another known type of hydraulic copying apparatus of the co-ordinated bi-axial type in which a stylus traces the surface contours of a pattern by scanning in parallel lines without manual control of the stylus scanning movement the apparatus includes two copying valves rigidly connected to the stylus and sensitive both to axial movements of the stylus in a direction perpendicular to the superficies of the pattern, and to oscillations of the stylus itself in a direction perpendicular to the axis of the stylus which is pre-arranged substantially perpendicular to the surface to be traced. Such apparatus automatically controls two axes of a machine in a known co-ordinated manner, whilst in the direction of the third axis incremental advances are controlled by means independent of the copying apparatus.

The abovementioned known types of copying apparatus have the disadvantage of not enabling transition from one contour pattern tracing mode, for example with automatic line-by-line scanning, to a manually controlled contour tracing mode according to the three-dimensional pantograph system and vice versa, thus necessitating a time-consuming change of the apparatus.

Copy apparatus is also known which enables transition from one type of contour tracing, for example with automatic line scanning, to the type with manual control of the stylus scanning by means of a three-dimensional pantograph system, and vice-versa. Such known apparatus, however, has the disadvantage that it requires the use of hydraulic copying valves of a special form dictated by their arrangement in the body of the apparatus. For example, the copying apparatus illustrated in U.S. Pat. Nos. 3,139,002 and 3,186,425 provides for a particular arrangement of three copying valves in the body of the apparatus, particularly as far as the third valve is concerned. In fact the adaptation of the apparatus to two different types of tracing, manual and automatic, is illustrated in both these U.S. Pat. Nos. and necessitates a third valve arranged axially with the stylus. In particular, in the apparatus of U.S. Pat. No. 3,139,002, the third valve is so dimensioned as to contain the stylus, whilst in the apparatus of U.S. Pat. No. 3,186,425 the third valve is so dimensioned as to contain the commutation means for effecting transition between copying with manual tracing and automatic tracing.

Such an arrangement requires the valve to have considerable diameter and mass, and the assembly of valves therefore occupies a large space. It follows that such valves, having large mass and dimensions, have very low vibrational frequencies with consequent dangers of dynamic instability, high friction and high hydro-dynamic forces due to the oil flux, all of which amount to considerable practical disadvantages.

An object of the present invention therefore, is to provide a copying apparatus capable of following the surface of a pattern irrespective of its contours and of copying with both manual contour tracing by the stylus and automatic tracing of the type with line scanning of the stylus over the pattern or template, in which it is possible to use copying valves of the usual type, so formed as to allow free selection of the parameters which make the best of the hydraulic characteristics of the valves.

Another object of the invention is to provide a copying apparatus of the type specified above, in which the means for adapting the apparatus to the two different copying modes, manual and automatic, is such that none of the three copying valves and in particular the third valve, need necessarily be coaxial with the stylus.

SUMMARY OF THE INVENTION

According to the invention there is provided hydraulic copying apparatus for application to machine tools, particularly milling machines, characterised in that the apparatus comprises a stylus arranged to make axial and oscillatory movements, a body in which are housed three copying valves two of which are arranged with their axes mutually perpendicular in a plane perpendicular to the axis of the stylus and the third of which is arranged with its axis not coaxial with the axis of the stylus, an oscillatory device for actuation of the third valve, interposed between the end of the stylus remote from the surface tip and the third valve, said device being always operatively connected to the said end of the stylus, whether for manual or automatic operation of the apparatus, to transfer to the third valve only the axial displacements of the stylus, and externally operable means associated with the said end of the stylus and when operative acting upon the oscillatory device to actuate the third valve in response to oscillations of the stylus, the said means being rendered operative during automatic operation of the apparatus, further means being provided to render the first two valves inoperative contemporaneously during automatic operation.

The apparatus according to this invention permits free selection of the form of the copying valve which best allows of meeting the requirements, from the hydraulic point of view, and dynamic stability with full advantage for precision and sensitivity of copying.

A further advantage obtained by means of this invention is the possibility of positioning the copying valves in the most suitable and convenient manner, simplifying and facilitating the reciprocal regulation mechanisms of the valves themselves.

BRIEF DESCRIPTION OF THE DRAWINGS

The invention will now be described in more detail, by way of non-limiting example, with reference to the accompanying drawings, in which.

DETAILED DESCRIPTION OF THE ILLUSTRATED EMBODIMENTS

With reference to the drawings, the apparatus comprises a body 1 in which are housed three hydraulic copying valves X, Y and Z, in this case of the spool type. Two of the copying valves, X and Y, are arranged with their axes perpendicular to each other in a plane perpendicular to the axis of a stylus 2. The third valve, Z, is arranged with its axis perpendicular to the said plane and parallel to the axis of the stylus 2.

The valves X and Y control copying movements of a tool or workpiece, in a manner known per se, in the $x$ and $y$ directions respectively of a pattern, or template (not shown).

The valve Z comprises two spool sections (FIG. 2): section $a$, which controls copying movements along an axis $z$ parallel to the axis of the stylus 2, and section $b$ which controls the co-ordinated advancing movement for copying along an axis $x$ and along an axis $y$ parallel to the axes of the two valves X and Y respectively.

Figure 1:
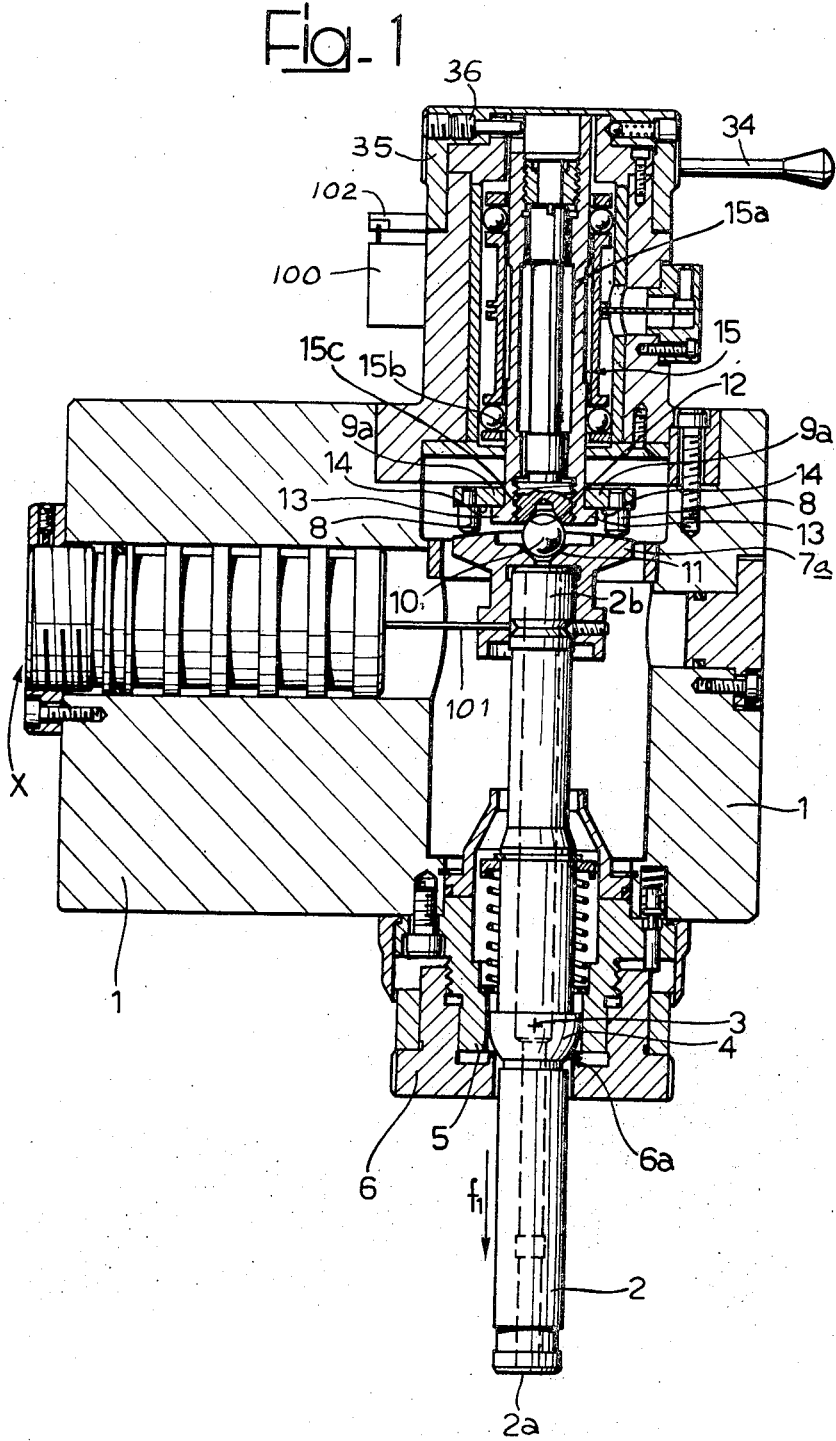
FIG. 1 is a vertical section of copying apparatus according to one embodiment of the invention, taken along the line I—I of FIG. 5, set for operation in the automatic mode, with line scanning of the contours of a pattern or template.

The stylus 2 is free to oscillate, under the influence of forces exerted on its tip 2a, around the centre 3 of a part-spherical swivel joint 4. The stylus 2 may also be displaced axially, the joint 4 being free to slide in a cylindrical seat 5. Axial movement of the stylus 2 is limited in the direction of the arrow $f_1$ (FIG. 1) by an adjustable ferrule 6 having an axially inwardly projecting annular lip 6a which abuts the part-spherical joint 4 and acts as a stop.

At the upper end 2b of the stylus 2 and fixed to it there is provided a cap 7a having an upwardly facing bevelled surface 7 upon which rest skids 8 attached to respective fork arms 9a at one end of an oscillatory lever 9.

A spherical ball 10 is located in a frusto-conical countersunk seat 11 formed centrally in the top of the cap 7a and a frusto-conical seat 12 formed in a slide 15 arranged coaxially with the stylus 2. The slide 15 has upper and lower coaxial parts 15a and 15b having a screw portion 15c which allows adjustment of the length of the slide 15. The slide 15 moreover has two lateral projections 13 which can be engaged and disengaged, as hereinafter described, with the downwardly facing surfaces 14 of the arms 9a of the lever 9.

The projections 13, according as to whether they are, or are not, engaged with the surfaces 14, selectively pre-dispose the apparatus for functioning in an automatic mode, with line-by-line scanning or in a manual contour tracing mode.

Figure 2:
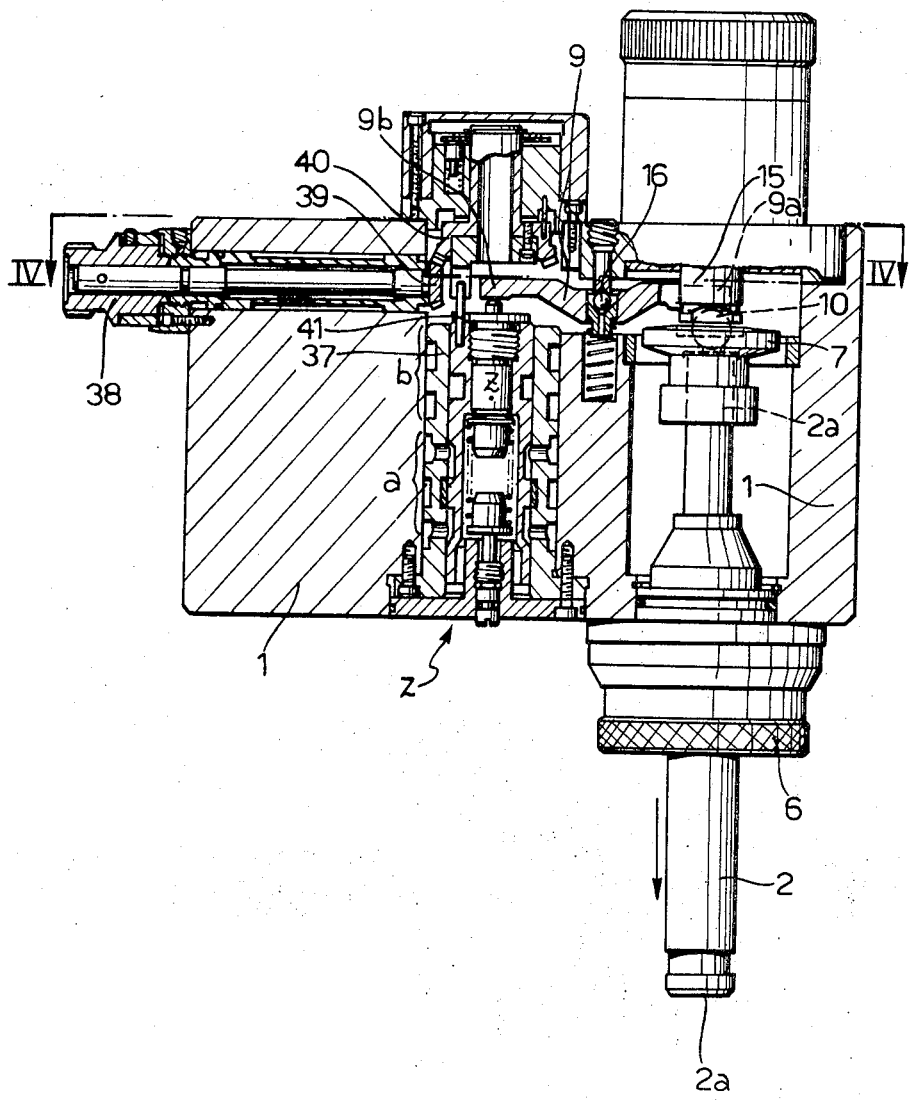
FIG. 2 is a view in vertical section of the apparatus, taken along the line II—II of FIG. 4.
Figure 3:
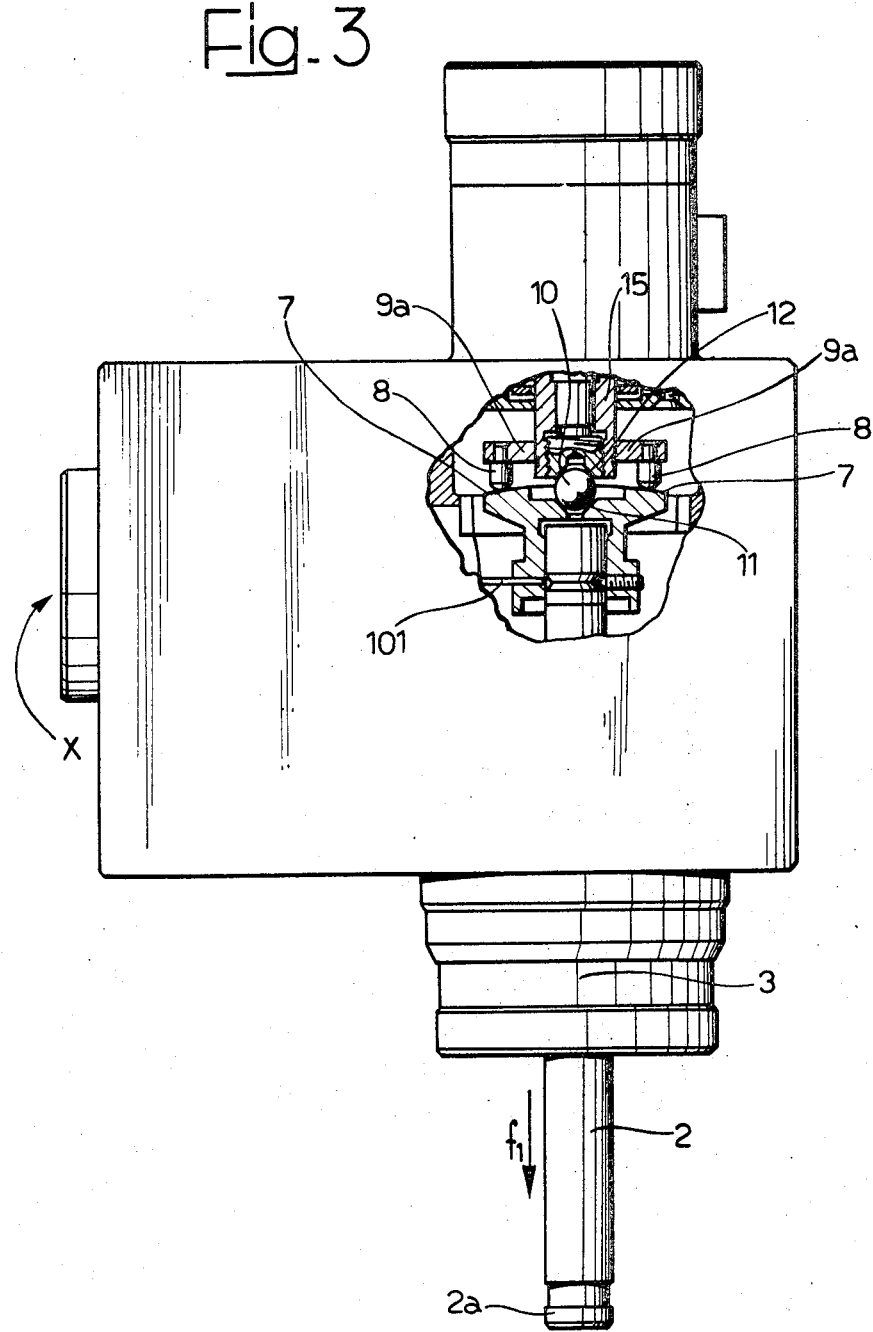
FIG. 3 is a side elevational view partly in section of the apparatus of FIGS. 1 and 2, set for manual contour tracing.
Figure 4:
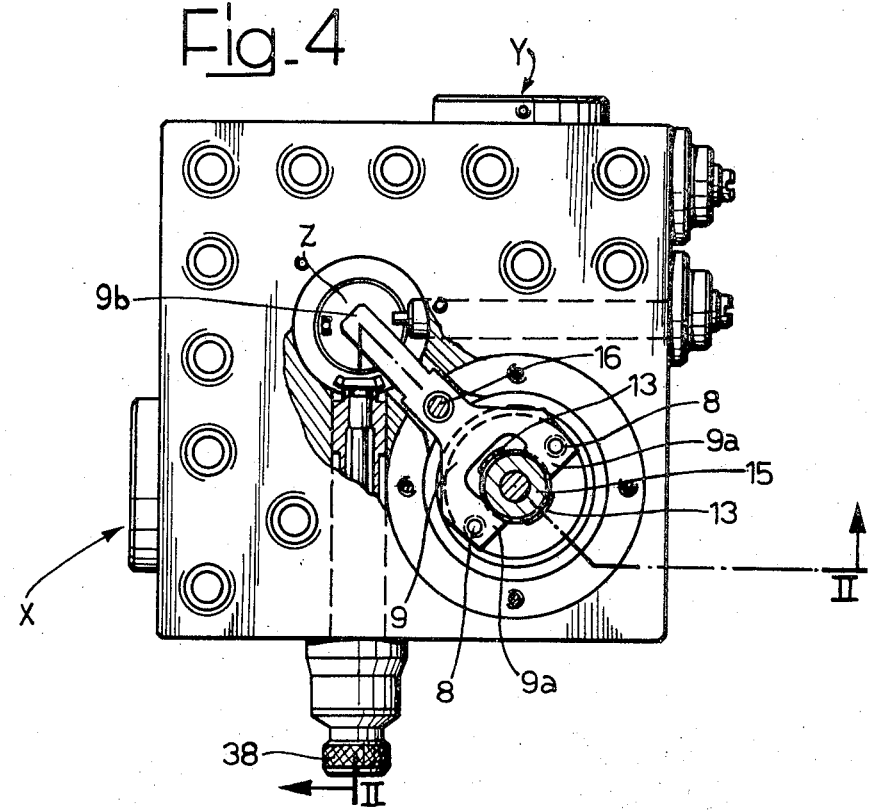
FIGS. 4 and 5 are plan views of the apparatus from above, partly in section, under conditions of manual and of automatic operation respectively.

FIGS. 2 and 3 show the apparatus pre-disposed for manual operation the stylus 2 being free to make angular oscillations about the point 3 and being free to move axially.

The oscillations of the stylus 2 control the valves X and Y through filiform rods 101. The axial movements of the stylus 2 are transmitted through the skids 8 to the lever 9, which is mounted for oscillation about a pivot 16, and a lever 9 in turn controls the valve Z which is in contact with the other end 9b of the lever. The lever 9 does not respond to the oscillatory movements of the stylus 2 since the surface 7 on which the skids 8 rest has a spherical surface with a centre coinciding with stylus pivot point 3. The oscillations of the stylus 2 do, however, cause axial movement of the slide 15 through the spherical ball 10 engaged between the frusto-conical seats 11 and 12. engaged between the frusto-conical When the apparatus is pre-disposed for manual operation the projections 13 of the slide 15 are not engaged with the downwardly facing surfaces 14 of the lever 9, and the axial movements of the slide 15 do not therefore influence the movement of the lever 9 itself. Consequently the valve Z is not responsive to such axial displacements of the slide 15.

The axial displacement of the slide 15 may be limited by elastic means, not shown, the position of which is adjustable by means of a handle outside the apparatus. By limiting the axial displacement of the slide 15, the amplitude of oscillation of the stylus 2 is also automatically limited and thus also the operation of the valves X and Y, thereby achieving some regulation of the speed along the axes $x$ and $y$. Such elastically preloaded limiting means allows of greater stylus oscillations under manual control, which overrides the elastic reaction of the limiting means, permitting rapid displacements along the axes $x$ and $y$ of the machine tool.

Figure 6:
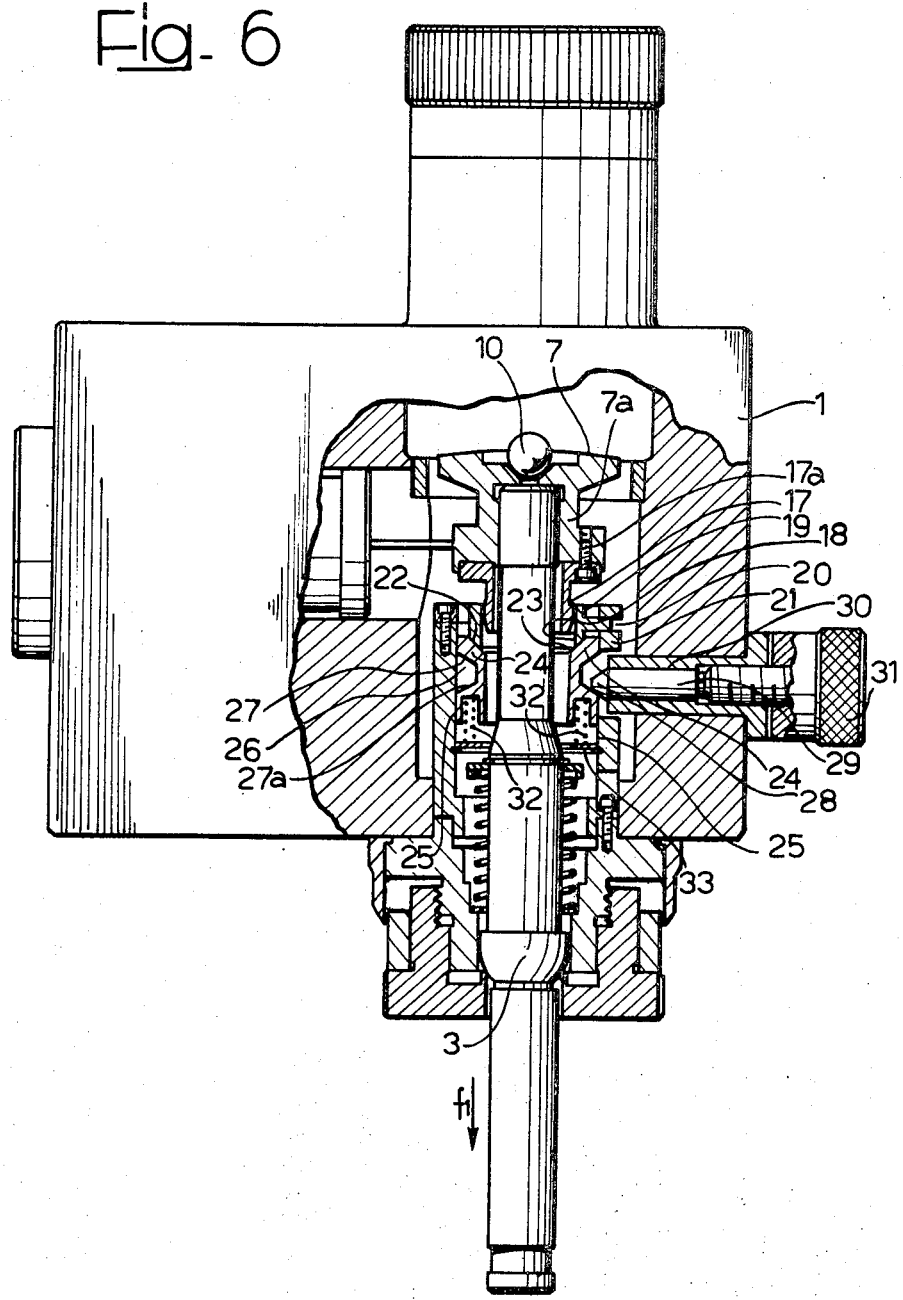
FIG. 6 is a side elevational view, partly in section, of the apparatus showing the means for limiting the oscillatory movements of the stylus and for allowing greater movements in the manual copying mode of operation.

Instead of providing elastic limiting means acting upon the slide 15, the oscillations of the stylus 2 may be controlled by other means, one example of which is depicted in FIG. 6.

Referring now to FIG. 6, a ferrule 17 is carried by the stylus 2, being fixed, for example by means of a screw 17a, to the cap 7a carrying the part spherical surface 7. The ferrule 19 is free to slide axially in a cylindrical bore 18 of an annular slider 19 which is in turn slidable in a horizontal plane in guideway 20 formed in an annular element 21 attached to or integral with the body 1.

The slider 19 has a lower frusto-conical convex surface 22 mating with a complementary concave frusto-conical surface 23 formed on a bush 24 which is free to slide in a cylindrical bore 25 fixed relative to the body 1. The bush 24 is provided with an external circumferential groove 26 of truncated V-cross-section having inclined walls 27 and 27a. In the groove 26 there is inserted a frusto-conical tip 28 of a metal pin 29 which is movable axially within a transversely disposed sleeve 30 seated in the body 1, the pin 29 being controllable from the exterior of the apparatus by means of a knob 31.

The bush 24 rests, through disposed springs 32, on an annular reaction plate 33 concentric with the stem of the stylus 2 and secured within the cylindrical bore 25.

With the apparatus described with reference to FIG. 6, axial movements of the stylus 2 may occur freely, but oscillations of the stylus 2 are limited by virtue of elastic preloading produced by the springs 32. In fact, according the position of adjustment of the tip 28 of the pin 29 relative to the groove 26 of the bush 24, a predetermined spacing is obtained between the frusto-conical surfaces 22 and 23. Consequently, during the oscillations of the stylus 2 the ferrule 17 will be able to displace the annular slider 19, in the horizontal plane only, by an amount dependent upon the clearance between the frusto-conical surfaces 22 and 23. The oscillations of the stylus 2 are therefore limited by the range of permitted displacement of the slider 19.

When high amplitude oscillations of the stylus are required, consistent with rapid displacements on the machine tool, such displacements are still possible by overcoming the reaction of the springs 32 interposed between the bush 24 and the plate 33.

Figure 5:
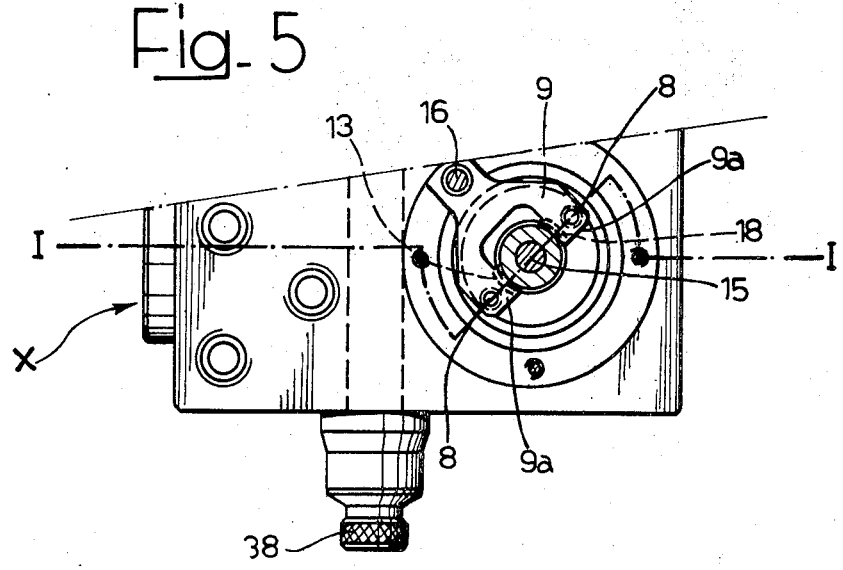

If the apparatus is to be set for automatic contour tracing of the co-ordinated bi-axial type (FIGS. 1 and 5) then it is necessary to engage the projections 13 of the slide 15 with the surfaces 14 of the fork arms 9a of the lever 9. This operation may be carried out from outside the apparatus by using a handle 34 to rotate a sleeve 35 through 90°, the sleeve 35 being connected through a radial pin 36 to the slide 15 to rotate the latter through the same angle.

Since the slide 15, as has been seen, moves in response both to axial and oscillatory movements of the stylus 2, the latter behaves after the manner of a universal-type stylus. The lever 9 therefore oscillates around the pivot 16 not only as a result of the axial movements of the stylus 2, but also as a result of the oscillations of the stylus 2, since the axial displacements of the slide 15 are transferred by the arms 9a to the lever 9 by means of the lateral projections 13 on the slide 15 itself.

The end 9b of the lever 9 controls the valve Z by effecting displacements of the latter which are in part dependent upon the axial displacement of the stylus 2 and in part dependent upon the oscillations of the latter.

The sleeve 35, upon being rotated by the handle 34 to bring the projections 13 into cooperation with the arm 9a of the lever 9, acts on a microswitch 100 through a cam 102 carried by the sleeve 35. Upon operation the microswitch 100 cuts off the valves X and Y from their associated machine tool hydraulic control circuits, so that these valves, even if they are then actuated again by the filiform rods 101, do not affect the hydraulic circuits. Thus, in the automatic tracing mode the valves X and Y are inhibited from functioning.

Thus the apparatus then controls two axes of the machine, specifically the vertical axis z through a spool section a of the valve Z (FIG. 2) and a horizontal axis (x or y, according to choice), through a spool section b of the same valve Z. The speed of the machine along these two axes are co-ordinated one with the other, in known manner, according to a parabolic law.

Regulation of the copying speed along the horizontal axis x (or y) is effected by rotation of a hollow piston 37 of the valve Z, which has a special conformation of the passage orifices for the oil flowing through the valve section b, so that the cross section of the latter increases or decreases progressively upon rotation of the piston 37. Rotation of the piston 37 is effected by means of a knob 38 which rotates a bevel gear 40 through a meshing bevel gear 39, the bevel gear 40 being connected to the piston 37 through an axially extending pin 41.

With the apparatus herein described it will be appreciated that it is possible to effect by means of one and the same apparatus, and by means of simple external commutation, operation with manual scanning, and operation under automatic control with co-ordinated bi-axial type scanning.

It will be understood that the apparatus according to the invention as herein described may be embodied in various practical forms, all within the scope of the claims which follow.

What is claimed is:

1. Hydraulic copying apparatus for application to machine tools, particularly milling machines, comprising a body, a stylus having an end within said body, means supporting the stylus for axial and oscillatory movements, three copying valves housed in said body, two said valves being arranged with their axes mutually perpendicular in a plane perpendicular to the axis of said stylus and the third said valve being arranged with its axis displaced from the axis of the stylus, an oscillatory device connected to said third valve for actuation of the latter, said oscillatory device being interposed between said end of said stylus and said third valve, means operatively connecting said device to said end of said stylus, both for manual and for automatic operation of the apparatus, said means transmitting to said third valve only the axial displacements of said stylus, means operable from outside said body, associated with said end of the stylus, and when operative acting upon said oscillatory device for actuation of said third valve in response to oscillations of the stylus, said means being operative during automatic operation of the apparatus, and further means effective during automatic operation to render inoperative contemporaneously said first two valves arranged in said plane perpendicular to the axis of said stylus.

2. Apparatus according to claim 1 wherein said third valve is arranged in said body with its axis perpendicular to said plane in which the axes of said first two valves are disposed, and parallel to the axis of said stylus.

3. Hydraulic copying apparatus for application to machine tools, particularly milling machines, comprising a body, a stylus having an end within said body, means supporting the stylus for axial and oscillatory movements, three copying valves housed in said body, two said valves being arranged with their axes mutually perpendicular in a plane perpendicular to the axis of said stylus and the third said valve being arranged with its axis displaced from the axis of the stylus, a spherical surface formed at said end of said stylus, an oscillatory device connected to said third valve for actuation of the latter, said oscillatory device being interposed between said end of said stylus and said third valve, and comprising a double lever having a forked end operatively associated with said stylus, respective distancing elements carried by said forked end and resting on points of said spherical surface formed on said end of said stylus, said spherical surface having centre coinciding with the centre of oscillation of said stylus, means operatively connecting said device to said end of said stylus, both for manual and for automatic operation of the apparatus, said means transmitting to said third valve only the axial displacements of said stylus, means operable from outside said body, associated with said end of the stylus, and when operative acting upon said oscillatory device for actuation of said third valve in response to oscillations of the stylus, said means being operative during automatic operation of the apparatus, and further means effective during automatic operation to render inoperative contemporaneously said first two valves arranged in said plane perpendicular to the axis of said stylus.

4. Apparatus according to claim 3, wherein said means operable from outside said body, acting upon said oscillatory device, are constituted by a slide in the form of a rod positioned on a prolongation of the axis of said stylus, respective frusto-conical seats formed respectively on the adjacent ends of said slide and said stylus, and a spherical ball interposed between the adjacent ends of said slide and said stylus and compressed between said seats, said slide being mounted rotatably about its axis and being provided with at least one projection located beneath the forked end of said lever, and wherein means are provided, operable from outside said body of the apparatus, to cause rotation of said slide about its own longitudinal axis to bring said projections selectively into and out of cooperation with said lever, said projections when in cooperation with said lever operating the latter in response to oscillations of the stylus.

5. Hydraulic copying apparatus for application to machine tools, particularly milling machines, comprising a body, a stylus having an end within said body, means supporting the stylus for axial and oscillatory movements, three copying valves housed in said body, two said valves being arranged with their axes mutually perpendicular in a plane perpendicular to the axis of said stylus and the third said valve being arranged with its axis displaced from the axis of the stylus, an oscillatory device connected to said third valve for actuation of the latter, said oscillatory device being interposed between said end of said stylus and said third valve, means operatively connecting said device to said end of said stylus, both for manual and for automatic operation of the apparatus, said means transmitting to said third valve only the axial displacements of said stylus, means, operable from outside said body, associated with said end of the stylus, and when operative acting upon said oscillatory device for actuation of said third valve in response to oscillations of the stylus, said means being operative during automatic operation of the apparatus, means effective during automatic operation to render inoperative contemporaneously said first two valves arranged in said plane perpendicular to the axis of said stylus, and elastic preloading means limiting maximum deflection of the stylus, said elastic preloading being overcome by manual control of said stylus for the purpose of obtaining rapid displacements on the machine tool.

6. Apparatus according to claim 6, wherein said elastic preloading means include a ferrule associated with the stem of the stylus, a cylindrical seat coaxial with said stylus within which said ferrule is slidable axially, a slider fixed relative to said cylindrical seat and guide means in said body of the apparatus guiding said slider for movement in a direction perpendicular to the axis of the stylus, said slider being provided with a convex frusto-conical surface, a bush provided with a complementary concave frusto-conical surface, said bush being coaxial with said stylus, and further including a cylindrical seat fixed relative to the body of the apparatus, in which said bush slides, spring means acting on said bush and exerting a force thereon parallel to the axis of said stylus, a plate attached to said body, against which said spring reacts, and regulable means acting on said bush for positioning the bush at a predetermined distance from said frusto-conical surface of said slider.

7. Apparatus according to claim 6, wherein said regulable means comprise a peripheral groove with inclined walls in the external surface of said bush, and a metal pin with a frusto-conical tip inserted in the groove, and including means supporting said pin for movement in said body of the apparatus in a transverse direction substantially perpendicular to the axis of said bush selectively to insert said pin into and withdraw said pin from said groove, and means operable from outside said body for adjusting said pin in said transverse direction.

* * * * *